(12) United States Patent  
Fennell

(10) Patent No.: US 10,051,925 B2  
(45) Date of Patent: Aug. 21, 2018

(54) FIXTURING APPARATUS

(71) Applicant: Michael P. Fennell, Alameda, CA (US)

(72) Inventor: Michael P. Fennell, Alameda, CA (US)

( * ) Notice: Subject to any disclaimer, the term of this patent is extended or adjusted under 35 U.S.C. 154(b) by 0 days.

(21) Appl. No.: 15/469,189

(22) Filed: Mar. 24, 2017

(65) Prior Publication Data

US 2017/0196316 A1   Jul. 13, 2017

Related U.S. Application Data

(60) Division of application No. 14/144,048, filed on Dec. 30, 2013, now Pat. No. 9,629,422, which is a continuation-in-part of application No. 12/741,821, filed as application No. PCT/US2008/082685 on Nov. 6, 2008, now Pat. No. 8,615,854.

(60) Provisional application No. 60/985,881, filed on Nov. 6, 2007.

(51) Int. Cl.
| | |
|---|---|
| *A44B 18/00* | (2006.01) |
| *F16B 5/07* | (2006.01) |
| *F16B 5/12* | (2006.01) |
| *F16B 11/00* | (2006.01) |

(52) U.S. Cl.
CPC ............ *A44B 18/0069* (2013.01); *F16B 5/07* (2013.01); *F16B 5/12* (2013.01); *F16B 11/00* (2013.01)

(58) Field of Classification Search
CPC .......... A44B 18/0069; F16B 5/07; F16B 5/12; F16B 11/00
See application file for complete search history.

(56) References Cited

U.S. PATENT DOCUMENTS

| | | |
|---|---|---|
| 2,977,145 A | 3/1961 | Rifkin |
| 3,214,816 A | 11/1965 | Mathison |
| 3,247,848 A | 4/1966 | Mathison |
| 3,261,069 A | 7/1966 | Mathison |
| 3,581,347 A | 6/1971 | Verspieren |
| 3,900,923 A | 8/1975 | Thomas |
| 3,931,838 A | 1/1976 | Bakermans |
| 4,008,512 A | 2/1977 | Prodel |
| 4,154,418 A | 5/1979 | Wiese |
| 4,393,548 A | 7/1983 | Herb |
| 4,680,838 A | 7/1987 | Astl |
| 4,879,854 A | 11/1989 | Handler |
| 4,882,813 A | 11/1989 | Nakamura |

(Continued)

FOREIGN PATENT DOCUMENTS

| | | |
|---|---|---|
| CH | 682450 | 9/1993 |
| JP | 2001521771 A | 11/2001 |

(Continued)

OTHER PUBLICATIONS

International Search Report and Written Opinion dated Apr. 20, 2015 for PCT/US2014/072803.

(Continued)

*Primary Examiner* — Robert John Sandy  
*Assistant Examiner* — Michael S Lee  
(74) *Attorney, Agent, or Firm* — Jiarong L. Lamiquiz; Quarles & Brady LLP

(57) ABSTRACT

A fixturing apparatus which includes a tubular member formed to have an aperture extending therethrough, the aperture having a first end and a second end, in combination with a plurality of locking teeth disposed on a surface defining said aperture and extending into the aperture.

8 Claims, 25 Drawing Sheets

(56) References Cited

U.S. PATENT DOCUMENTS

| | | | |
|---|---|---|---|
| 5,419,744 A | | 5/1995 | Kagebeck |
| 5,568,952 A | * | 10/1996 | Ruegg ................ B65D 63/1081 292/307 A |
| 5,755,016 A | | 5/1998 | Provost |
| 5,887,320 A | | 3/1999 | Provost |
| 6,478,784 B1 | | 11/2002 | Johnson et al. |
| 6,625,851 B1 | | 9/2003 | Matin et al. |
| 6,656,563 B1 | | 12/2003 | Leach et al. |
| 6,668,429 B2 | | 12/2003 | Fujisawa et al. |
| 6,684,667 B2 | * | 2/2004 | Young .................... A41F 1/008 70/18 |
| 7,263,745 B2 | | 9/2007 | Mori |
| 7,444,722 B2 | | 11/2008 | McDaniel et al. |
| 7,478,460 B2 | | 1/2009 | Gallant et al. |
| 7,579,556 B2 | * | 8/2009 | Tapper .................. H02G 3/088 16/2.1 |
| 2003/0182771 A1 | | 10/2003 | Leach et al. |
| 2004/0154139 A1 | * | 8/2004 | Crook ................ B65D 63/1018 24/16 PB |
| 2005/0241119 A1 | | 11/2005 | Efremova et al. |
| 2007/0054538 A1 | | 3/2007 | Smith et al. |
| 2007/0264469 A1 | | 11/2007 | Gallant et al. |
| 2010/0104394 A1 | * | 4/2010 | Kwasiborski ............ H02G 3/32 411/247 |

FOREIGN PATENT DOCUMENTS

| | | |
|---|---|---|
| JP | 2002529123 A | 9/2002 |
| JP | 2004000641 A | 1/2004 |
| WO | 2009061957 | 5/2009 |

OTHER PUBLICATIONS

International Preliminary Report on Patentability dated Jul. 2, 2013 for PCT/US11/67561.

Japanese Office Action dated Feb. 19, 2013 for Japanese Application No. 2010-533248.

European Office Action dated Nov. 8, 2012 for European Application No. 08847103.2.

International Search Report and Written Opinion dated Apr. 25, 2012 for PCT/US11/67561.

Supplementary European Search Report dated Feb. 24, 2012 for European Application No. 08847103.2.

International Preliminary Report on Patentability dated May 11, 2010 for PCT/US08/82685.

International Search Report and Written Opiniondated Jan. 6, 2009 for PCT/US08/82685.

* cited by examiner

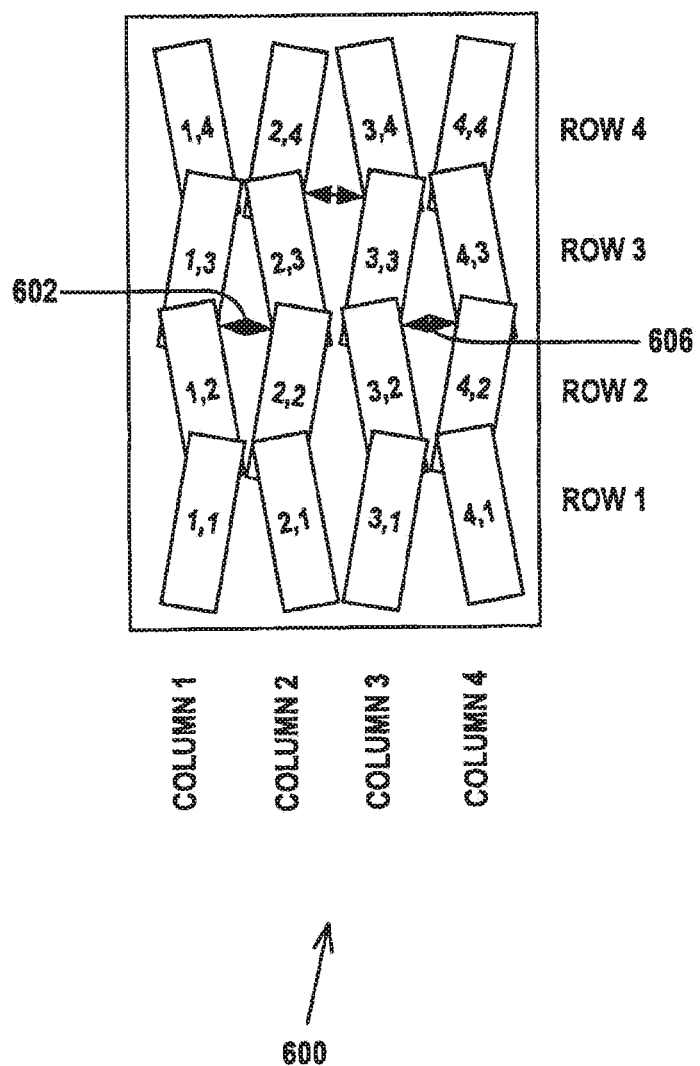

US 10,051,925 B2

FIXTURING APPARATUS

CROSS-REFERENCE TO RELATED APPLICATIONS

This Application is a Divisional of U.S. Non-Provisional Application having Ser. No. 14/144,048, filed on Dec. 30, 2013, which is a Continuation-In-Part of a U.S. Non-Provisional Patent Application having Ser. No. 12/741,821, filed on Sep. 13, 2010, now U.S. Pat. No. 8,615,854 which claimed priority from an International Patent Application having a PCT Application No. PC/US08/82685 filed on Nov. 6, 2008, which claimed priority from a U.S. Provisional Patent Application having Ser. No. 60/985,881 filed Nov. 6, 2007. Each of the above referenced patents and/or patent applications is hereby incorporated herein by reference in its entirety.

TECHNOLOGY FIELD

This invention relates to a method to form a fixturing apparatus. In certain embodiments, the invention relates to a fixturing apparatus for cables.

BACKGROUND

It is known in the art to releaseably attach a first surface to a second surface by disposing a plurality of flexible loop-type fasteners on one of the surfaces and a plurality of flexible hook-type fasteners on the other surface. When mated, the plurality of flexible hook-type fasteners engage with the plurality of flexible loop-type fasteners to releaseably secure the first surface to the second surface.

BRIEF DESCRIPTION OF THE DRAWINGS

The invention will be better understood from a reading of the following detailed description taken in conjunction with the drawings in which like reference designators are used to designate like elements, and in which:

FIG. 6A is a first top view of the plurality of Applicant's rigid locking teeth arranged in a third orientation;

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
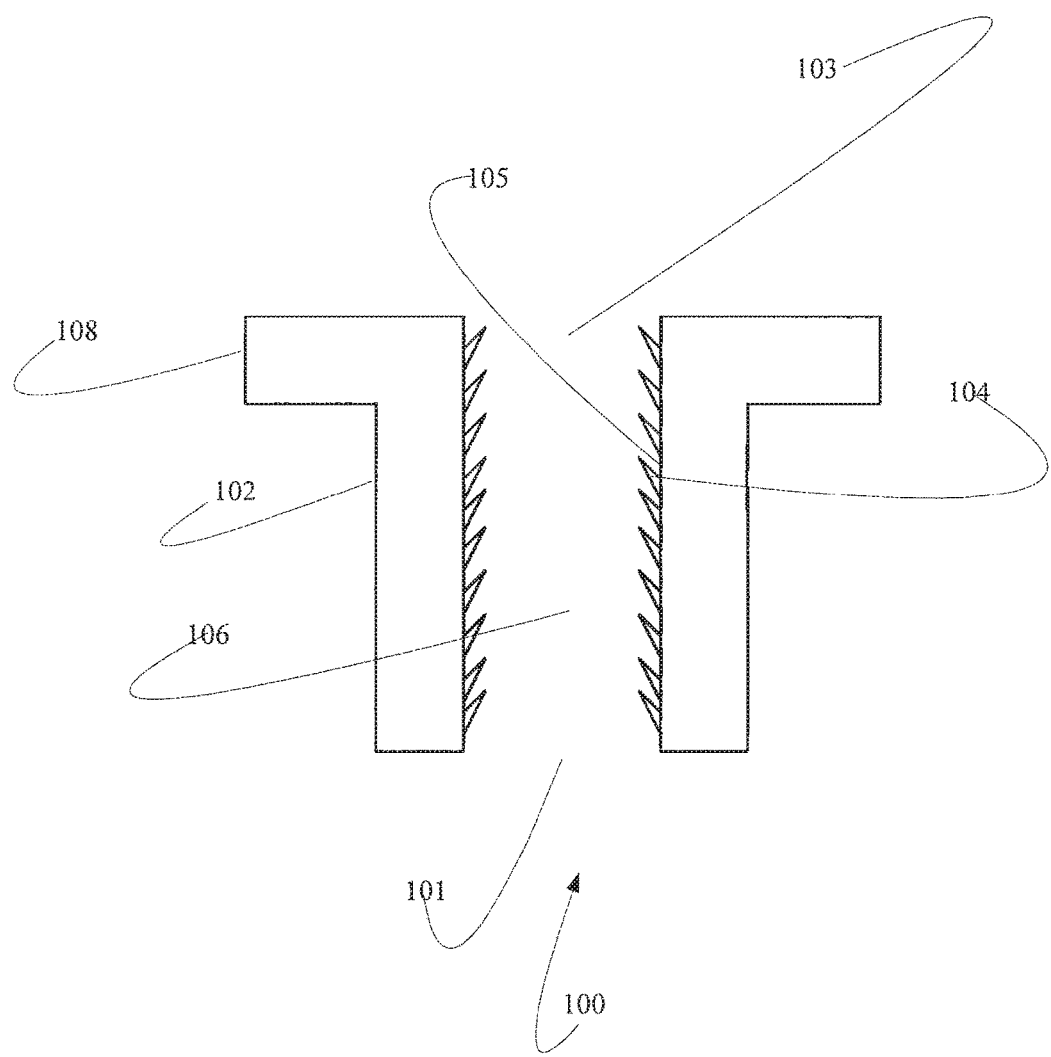
FIG. 1 is a cross sectional view of Applicant's fixturing apparatus 100.

Referring now to FIG. 1, fixturing apparatus 100 comprises a tubular member 102. Fixturing apparatus 100 is formed to include an aperture 106 extending therethrough. Aperture 106 is defined by cylindrical wall 105. In the illustrated embodiment of FIG. 1, a plurality of rigid locking teeth 104 extend outwardly from cylindrical wall 105 into aperture 106. Aperture 106 comprises a first opening 101 and a second opening 103.

Annular lip 108 is attached to tubular member 102 at opening 103 of aperture 106. In certain embodiments, annular lip 108 and tubular member 102 comprise an integral assembly.

Figure 2:
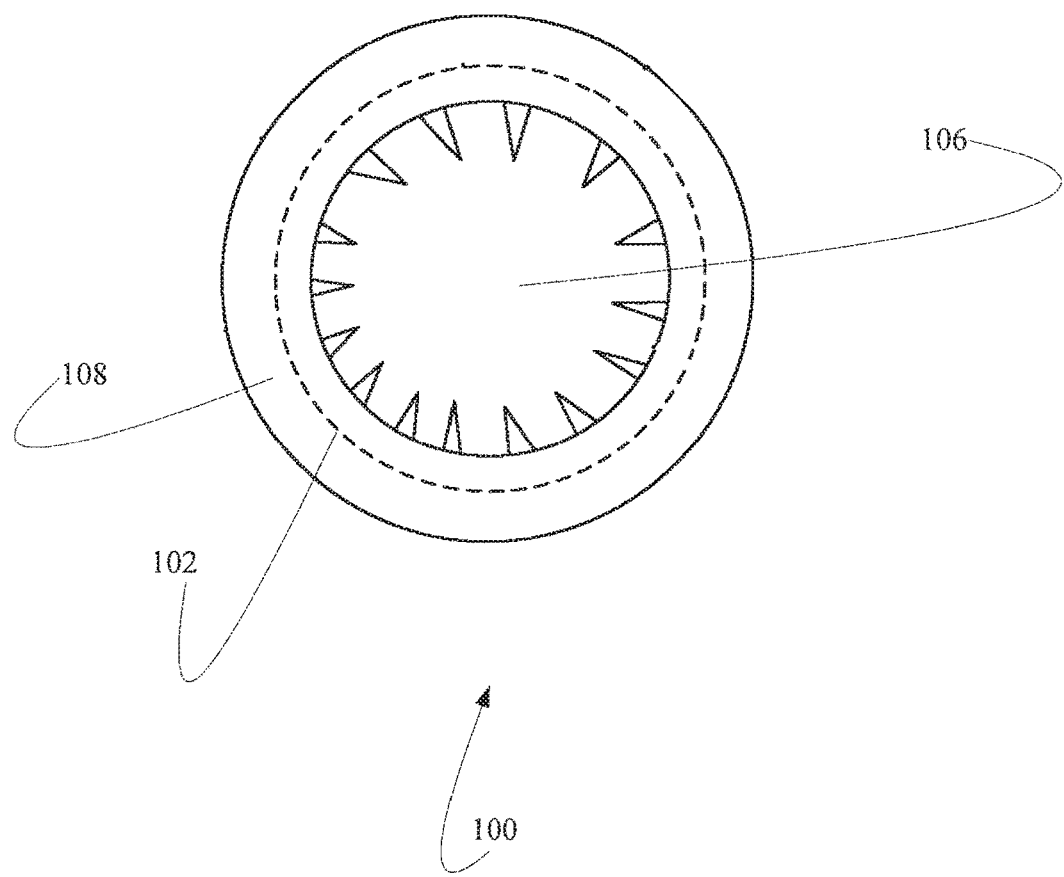
FIG. 2 is a top view of Applicant's fixturing apparatus 100.

FIG. 2 is a top view of fixturing apparatus 100.

Figure 3A:
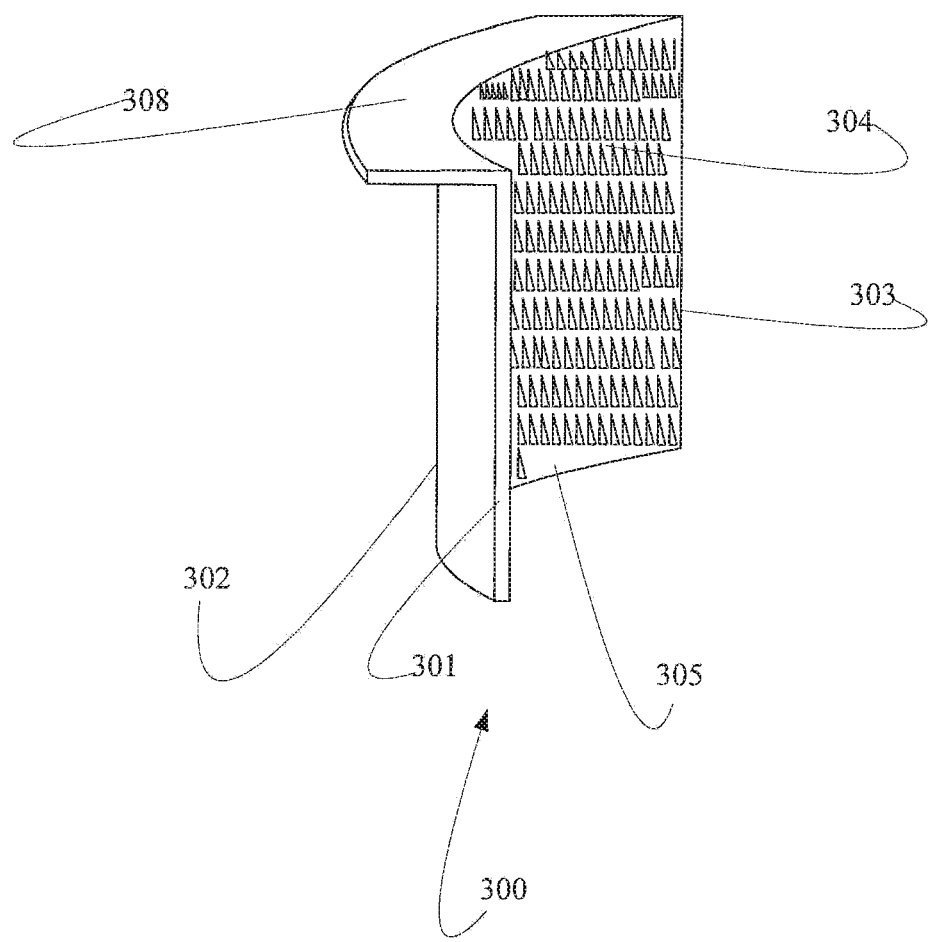
FIG. 3A illustrates a subassembly used to form the fixturing apparatus of FIG. 1.
Figure 3B:
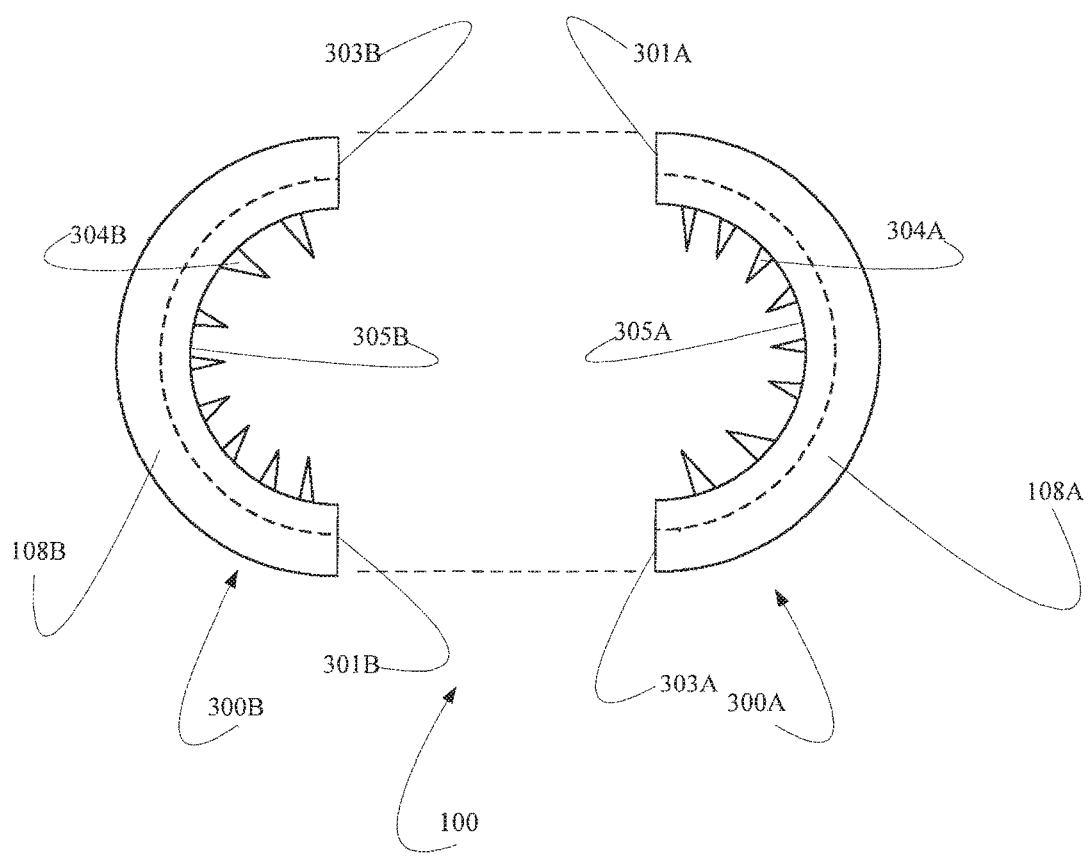
FIG. 3B illustrates two of the subassemblies of FIG. 3A being attached to one another to form the fixturing apparatus of FIG. 1.

Referring now to FIGS. 3A and 3B, in certain embodiments, fixturing apparatus 100 is formed from subassemblies 300A and 300B. Each subassembly 300 comprises a semi-circular member 302 in combination with lip 308 which extends outwardly from semi-circular member 302.

In the illustrated embodiment of FIG. 3A, a plurality of rigid locking teeth 304 are formed in each subassembly 300. In the illustrated embodiment of FIG. 3B, a first plurality of rigid locking teeth 304A are formed in subassembly 300A, and second plurality of rigid locking teeth 304B are formed in subassembly 300B.

In certain embodiments Applicant's fixturing apparatus 100 is formed by attaching surface 301A of a first fixturing subassembly 300A to surface 303B of a second fixturing subassembly 300B, and by attaching surface 303A of the first fixturing subassembly 300A to surface 301B of the second fixturing subassembly 300B.

In certain embodiments, the attachment of surfaces 301A and 303B, and the attachment of surfaces 301B and 303A is made using an adhesive. In certain embodiments, the attachment of surfaces 301A and 303B, and the attachment of surfaces 301B and 303A is made using ultrasonic welding.

In certain embodiments, Applicant's plurality of rigid locking teeth are formed from one or more metals. In certain embodiments, Applicant's plurality of rigid locking teeth are formed from one or more ceramic materials. In certain embodiments, Applicant's plurality of rigid locking teeth are formed from a polymeric material selected from a group consisting of nylon, polyamide, polyimide, polyamideimide, polyurethane, polyethylene, polypropylene, polycarbonate, polystyrene, and combinations thereof. In certain embodiments, fixturing apparatus 100 is formed from a polymeric material selected from the group consisting of nylon, polyamide, polyimide, polyamideimide, polyurethane, polyethylene, polypropylene, polycarbonate, polystyrene, and combinations thereof.

Figure 3C:
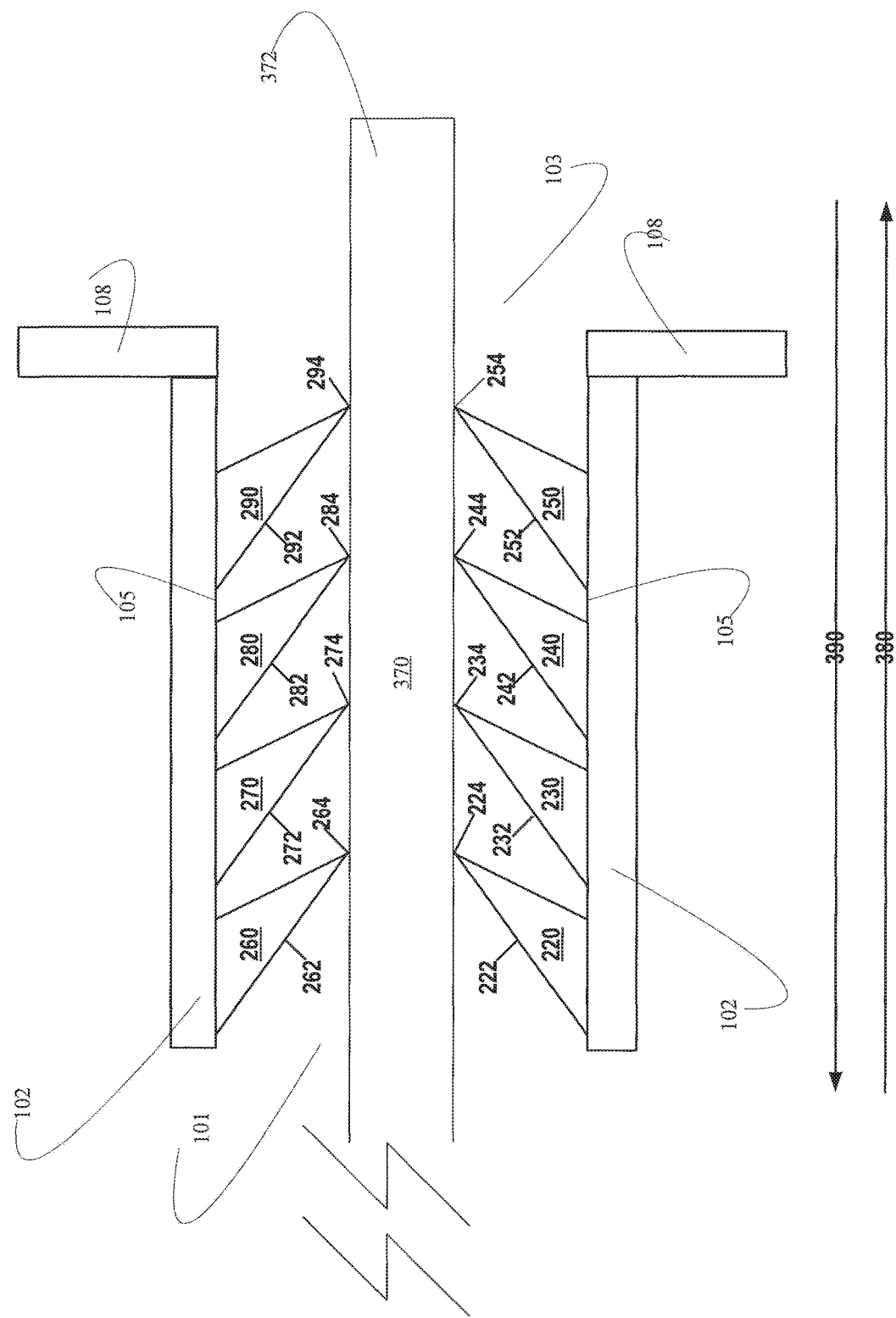
FIG. 3C is a cross-sectional view of the fixturing apparatus of FIG. 1.

FIG. 3C is a cross-sectional view of Applicant's fixturing apparatus 100, and shows a first plurality of rigid locking teeth 220, 230, 240, and 250, disposed on aperture surface 105. In certain embodiments, this portion of aperture surface 105 comprises surface 305A of subassembly 300A. Locking teeth 220, 230, 240, and 250, comprise a portion of the plurality of locking teeth 104.

Rigid locking tooth 220 is formed to include a sloping side portion 222, and a gripping edge 224. Similarly, rigid locking teeth 230, 240, and 250, are formed to include sloping side portions 232, 242, and 252, respectively. Rigid locking teeth 230, 240, and 250, are further formed to include gripping edges 234, 244, 254, and 264, respectively.

FIG. 3C further shows a second plurality of rigid locking teeth 260, 270, 280, and 290, disposed on aperture surface 105. In certain embodiments, this portion of aperture surface 105 comprises surface 305B of subassembly 300B. Locking teeth 260, 270, 280, and 290, comprise a portion of the plurality of locking teeth 104.

Rigid locking teeth 260, 270, 280, and 290, are formed to include sloping side portions 262, 272, 282, and 292, respectively. Rigid locking teeth 260, 270, 280, and 290, are further formed to include gripping edges 264, 274, 284, and 294, respectively.

A fabric material, such as for example and without limitation strap 370, will slide across rigid locking teeth 220, 230, 240, 250, 260, 270, 280, and 290 in the non-fixturing direction 380, wherein that fabric moves across the sloping side portion of a rigid locking tooth before contacting the gripping edge of that rigid locking tooth. A fabric material will not, however, slide across rigid locking teeth 220, 230, 240, 250, 260, 270, 280, and 290, in the opposite, or fixturing direction 390. Rather when a force is applied to the fabric along the fixturing direction 390, portions of the fabric will engage gripping edges 224, 234, 244, 254, 264, 274, 284, and 294, thereby preventing movement of the fabric along the fixturing direction.

In embodiments wherein the fabric material comprises a plurality of flexible loop-type fasteners disposed on a surface in contact with locking teeth gripping edges 224, 234, 244, and 254, the gripping edges engage those flexible loop-type fasteners thereby preventing movement of the fabric in the fixturing direction. Similarly, in embodiments wherein the fabric material comprises a plurality of flexible loop-type fasteners disposed on a surface in contact with locking teeth gripping edges 264, 274, 284, and 294, the gripping edges engage those flexible loop-type fasteners thereby preventing movement of the fabric in the fixturing direction.

An end of a flexible strap 370 can be inserted into a first end 101 of the aperture 106, and moved in a first direction through aperture 106 and outwardly therefrom through a second end 103 of aperture 106. After insertion in and through aperture 106 in the first direction, the flexible strap 370 cannot be moved-backwardly through aperture 106 in a second and 180 degree opposite direction.

Applicant has found that fixturing is extremely strong when the strap 370 is confined to an enclosed channel, such as aperture 106, extending through fixturing apparatus 100.

In certain embodiments, one or more of Applicant's rigid locking teeth comprises a rectangular base, a first rectangular surface attached to a first end of said rectangular base and extending outwardly therefrom, and a second rectangular surface attached to an opposing end of said rectangular base and extending outwardly therefrom, wherein a first rectangular surface distal end is attached to a said second rectangular surface distal end to form a gripping edge. For example and referring now to FIG. 3D, in certain embodiments Applicant's fixturing apparatus comprises one or more looking teeth 300. Rigid locking tooth 300 comprises a first embodiment of a five-sided structure.

Figure 3D:
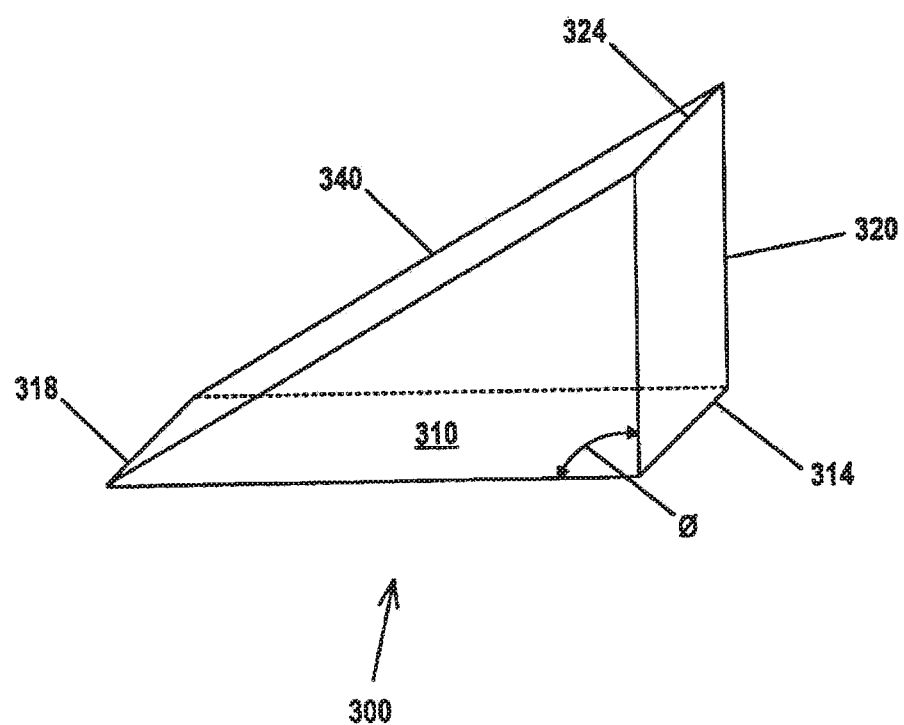
FIG. 3D shows a first embodiment of Applicant's rigid locking tooth.
Figure 3E:
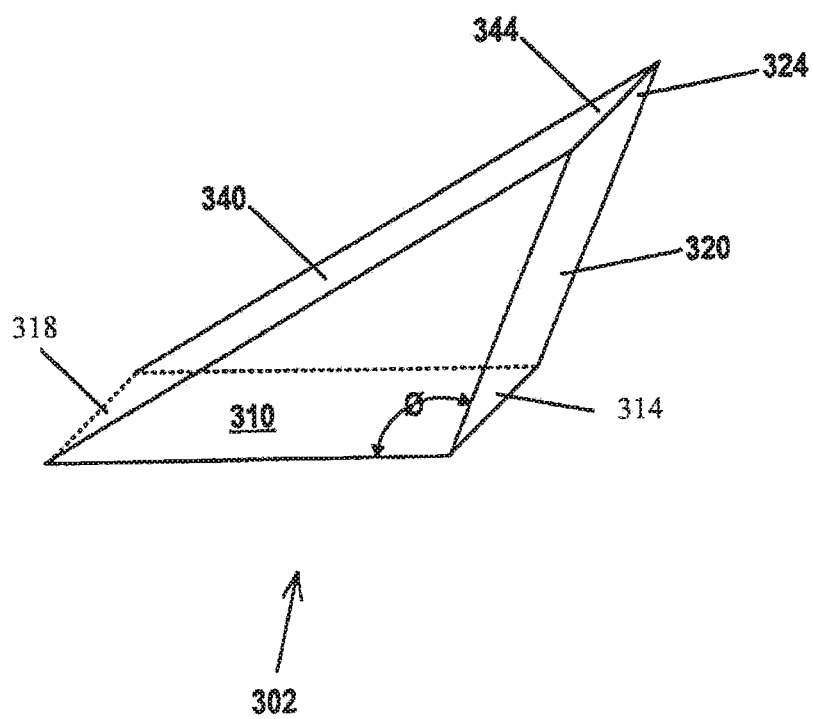
FIG. 3E shows a second embodiment of Applicant's rigid locking tooth.

Referring now to FIG. 3E, in certain embodiments Applicant's fixturing apparatus comprises one or more looking teeth 302. Rigid locking tooth 302 comprises a second embodiment of a five-sided structure.

Rigid locking teeth 300 and 302 comprise a rectangular base 310, a first rectangular surface 320 attached to a first end 314 of rectangular base 310 and extending outwardly therefrom, a second rectangular surface 340 attached to a second end 318 of rectangular base 310 and extending outwardly therefrom, wherein a first rectangular surface distal end is attached to a said second rectangular surface distal end to form a gripping edge 324.

With respect to rigid locking tooth 300, the first rectangular surface 320 in combination with rectangular base 310 define an internal dihedral angle of about 90 degrees. With respect to rigid locking tooth 302, the first rectangular surface 320 in combination with rectangular base 310 define an internal dihedral angle $\Phi$ greater than 90 degrees. In certain embodiments, $\Phi$ is about 110 degrees. In certain embodiments, $\Phi$ is about 120 degrees.

Figure 3F:
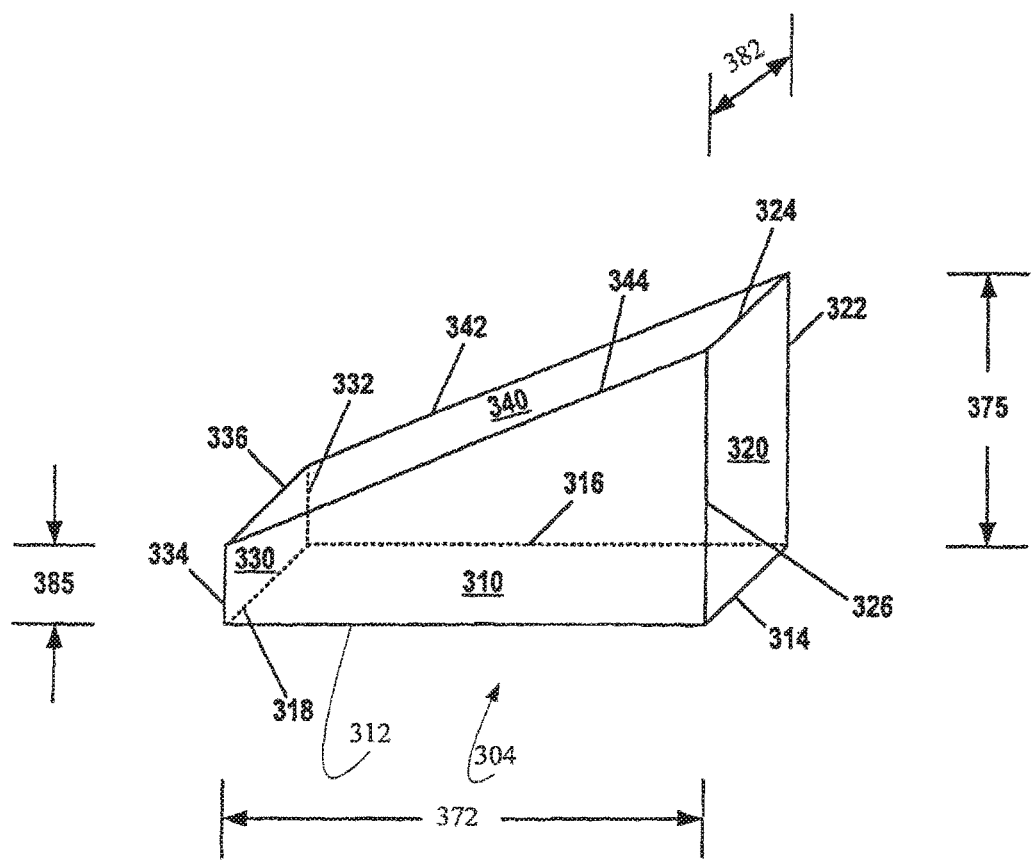
FIG. 3F shows a third embodiment of Applicant's rigid locking tooth.

Referring now to FIG. 3F, in certain embodiments Applicant's fixturing apparatus comprises one or more rigid locking teeth 304. Rigid locking tooth 304 comprises a first embodiment of a six-sided structure. Referring now to FIG. 3H, in certain embodiments Applicant's fixturing apparatus comprises one or more looking teeth 306. Rigid locking tooth 306 comprises a second embodiment of a six-sided structure.

In certain embodiments, Applicant's fixturing apparatus comprises zero or more rigid locking teeth 300, in combination with zero or more rigid locking teeth 302, in combination with zero or more rigid locking teeth 304, in combination with zero or more rigid locking teeth 306.

FIG. 3F shows Applicant's rigid locking tooth 304. The lengths, widths, heights, and axes, described with respect to rigid locking tooth 304 also apply to rigid locking teeth 300, 302, and 306. Base 310 comprises a rectangular shape defined by sides 312, 314, 316, and 318. Base 310 comprises a length 372 and a width 382. In certain embodiments, length 372 is between about 0.0002 mm and about 5.0 mm. In certain embodiments, width 382 is between about 0.0001 mm and about 2.5 mm.

Rectangular-shaped side 320, defined by sides 314, 322, 324, and 326, is attached to edge 314 of base 310 and extends upwardly therefrom. In the illustrated embodiment of FIG. 3A, side 320 and base 310 intersect to form a dihedral angle of about ninety degrees (90°). Side 320 comprises a height 375 and width 382.

In certain embodiments, height 375 is between about 0.0001 mm and about 5 mm. In certain embodiments, height 375 is about 0.0001 mm. In certain embodiments, height 375 is about 0.001 mm. In certain embodiments, height 375 is about 0.01 mm. In certain embodiments, height 375 is about 0.1 mm. In certain embodiments, height 375 is about 1 mm.

Rectangular-shaped side 330, defined by sides 318, 332, 334, and 336, is attached edge 318 of base 310, and extends upwardly therefrom. In the illustrated embodiment of FIG. 3F, side 330 and base 310 intersect to form a dihedral angle of about ninety degrees (90°). Side 330 comprises a height 385 and width 382. In certain embodiments, height 385 is between about 0 mm and about 2.0 mm.

As those skilled in the art will appreciate, where height 385 is 0 mm, rigid locking tooth 304 becomes rigid locking tooth 300. Where height 385 is 0 mm, sides 336 and 318 are the same, and top portion 340 intersects with base portion 310. The dimensions and axes described in FIGS. 3A through 3B are applicable to both rigid locking tooth 300 and rigid locking tooth 305.

Sides 320 and 330 have a facing relationship, wherein height 320 is greater than height 330. In certain embodiments wherein height 385 is greater than 0, the ratio of height 375 to height 385 is between about 2:1 to about 6:1.

Top 340 comprises a rectangular shape, and is defined by sides 324, 342, 336, and 344. Top 340 comprises width 382. Referring now to FIGS. 3A and 3D, side 350 comprises a quadrilateral shape with two parallel sides 326 and 334, and is defined by sides 312, 326, 334, and 344. Referring now to FIGS. 3A and 3E, side 360 comprises a quadrilateral shape with two parallel sides 322 and 332, and is defined by sides 316, 322, 332, and 342.

Figure 3G:
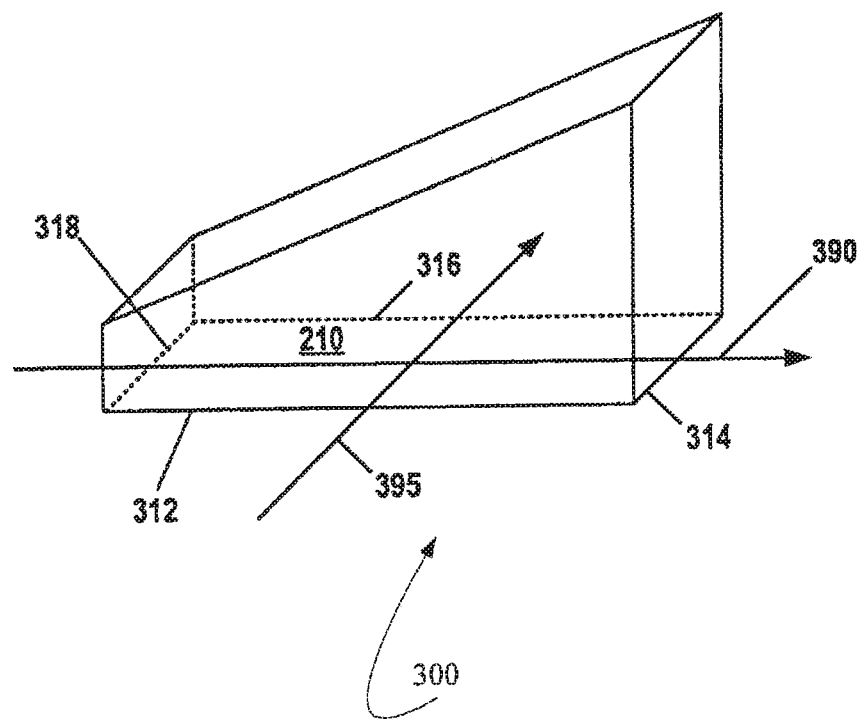
FIG. 3G shows a second perspective view of the rigid locking tooth of FIG. 3F.
Figure 3H:
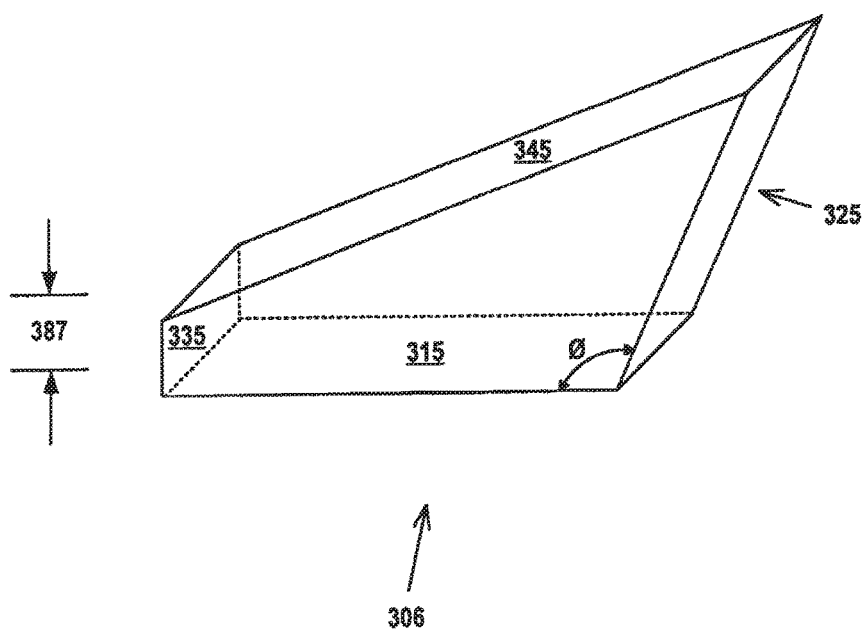
FIG. 3H shows a fourth embodiment of Applicant's rigid locking tooth.

Referring now to FIG. 3G, rigid locking tooth 300 comprises a long axis 390 comprising a first center line of base 210, wherein that long axis 390 is parallel to long sides 312 and 316 and bisects short sides 314 and 318. Rigid locking tooth 300 further comprises short axis 395 comprising a second center line of base 210, wherein that short axis 395 is parallel to short sides 314 and 318 bisects long sides 312 and 316.

FIGS. 3E and 3H illustrate Applicant's rigid locking teeth 302 and 306.

As a general matter, individual rigid locking teeth disposed in any given plurality of rigid locking teeth 104 are arranged in a pattern of columns and rows. In various embodiments of Applicant's invention, the orientations of individual rigid locking teeth disposed in such columns and rows differ. These various orientations are described herein with reference to the relationship of the long axes 390 (FIG. 3G) and short axes 395 (FIG. 3G) of adjacent rigid locking teeth in the same column, and the relationship of the long axes 390 and short axes 395 of adjacent rigid locking teeth in the same row.

References herein to axes being "aligned" mean that those axes are coaxial and/or parallel, i.e. overlap one another. Axes described herein as not being aligned are not coaxial, i.e. do not overlap. In orientations 400 (FIG. 4A) and 700 (FIG. 7A), the long axes of adjacent rigid locking teeth disposed in the same column are aligned. In orientations 500, 600, 800, and 900, the long axes of adjacent rigid locking teeth disposed in the same column are not aligned. In orientations 400, 500, 700, and 800, the long axes of adjacent rigid locking teeth disposed in the same row are parallel. In orientations 600 and 900, the long axes of adjacent rigid locking teeth disposed in the same row are not parallel.

In orientations 400, the short axes of adjacent rigid locking teeth disposed in the same row are aligned. In orientations 500, 600, 700, 800, and 900, the short axes of adjacent rigid locking teeth disposed in the same row are not aligned.

Figure 4A:
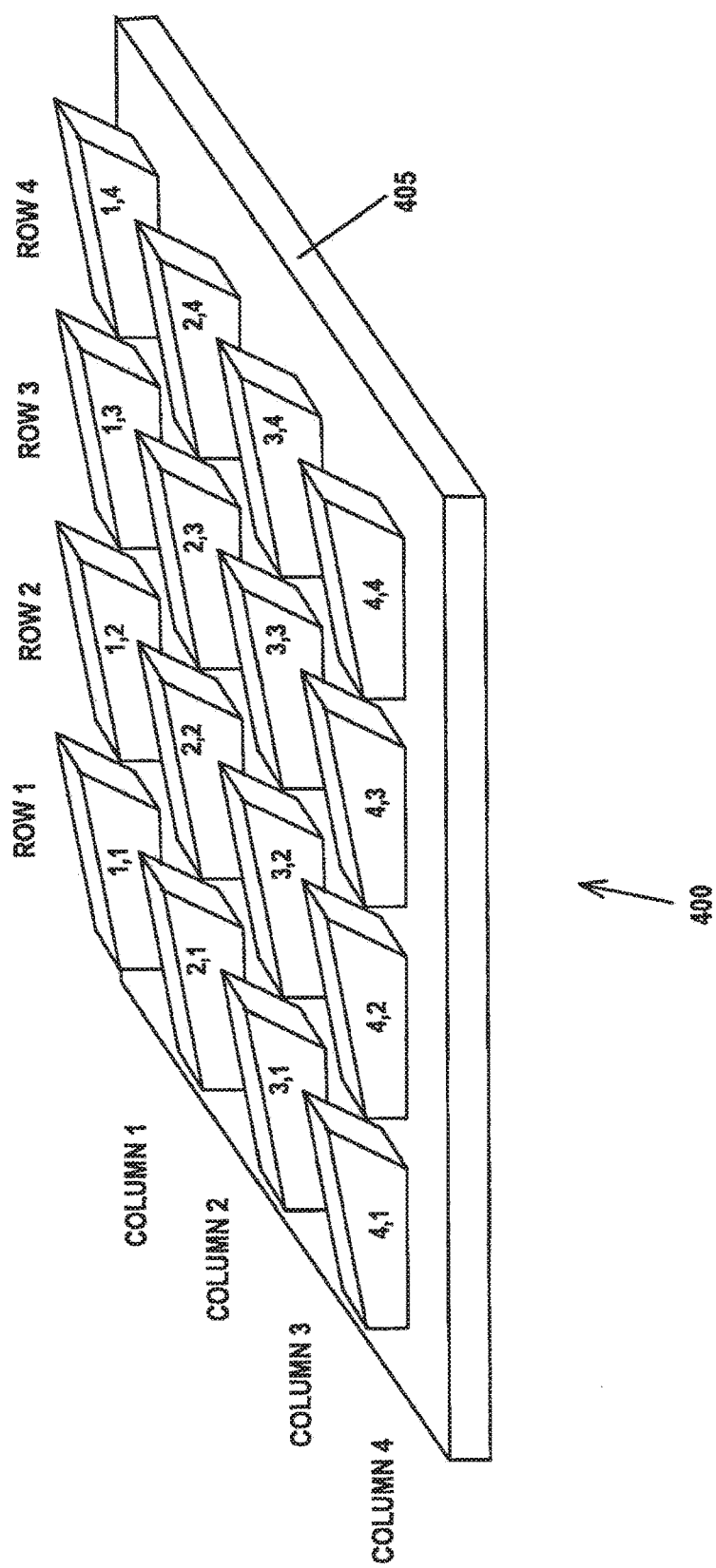
FIG. 4A is a perspective view of a plurality of Applicant's rigid locking teeth arranged in a first orientation.

FIG. 4A shows a portion of plurality of Applicant's rigid locking teeth, such as plurality of rigid locking teeth 104, wherein that plurality of rigid locking teeth comprise orientation 400. In certain embodiments, each of the plurality of rigid locking teeth shown in FIG. 4A comprises a rigid locking tooth 300. In certain embodiments, each of the plurality of rigid locking teeth shown in FIG. 4A comprises a rigid locking tooth 302. In certain embodiments, each of the plurality of rigid locking teeth shown in FIG. 4A comprises a rigid locking tooth 304. In certain embodiments, each of the plurality of rigid locking teeth shown in FIG. 4A comprises a rigid locking tooth 306. In certain embodiments, each of the plurality of rigid locking teeth shown in FIG. 4A is selected from the group consisting of a rigid locking tooth 300, a rigid locking tooth 302, a rigid locking tooth 304, and a rigid locking tooth 306.

In the illustrated embodiment of FIG. 4A, the plurality of rigid locking teeth are arranged in columns and rows, namely columns 1, 2, 3, and 4, and rows 1, 2, 3, and 4. In the illustrated embodiment of FIG. 4A, rigid locking tooth 1,1 for example is disposed in column 1 and row 1. For the sake of clarity, FIG. 4A shows a total of 16 rigid locking teeth. In actual implementation, Applicant's plurality of rigid locking teeth 104 comprises between about one hundred, and about ten thousand individual rigid locking teeth, per square inch.

Figure 4B:
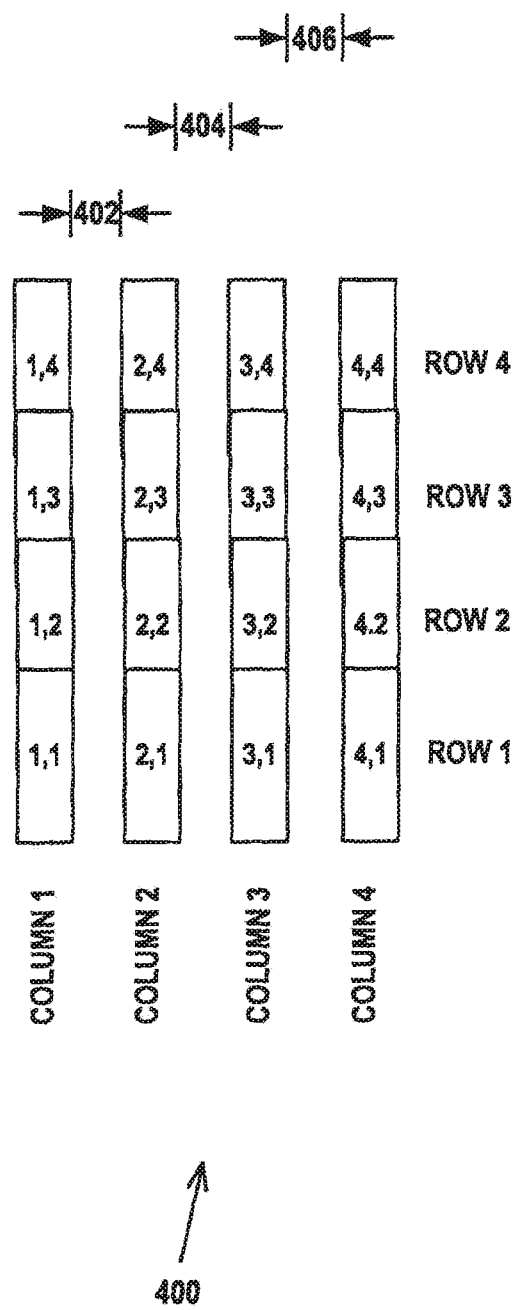
FIG. 4B is a first top view of the plurality of Applicant's rigid locking teeth shown in FIG. 4A.
Figure 4C:
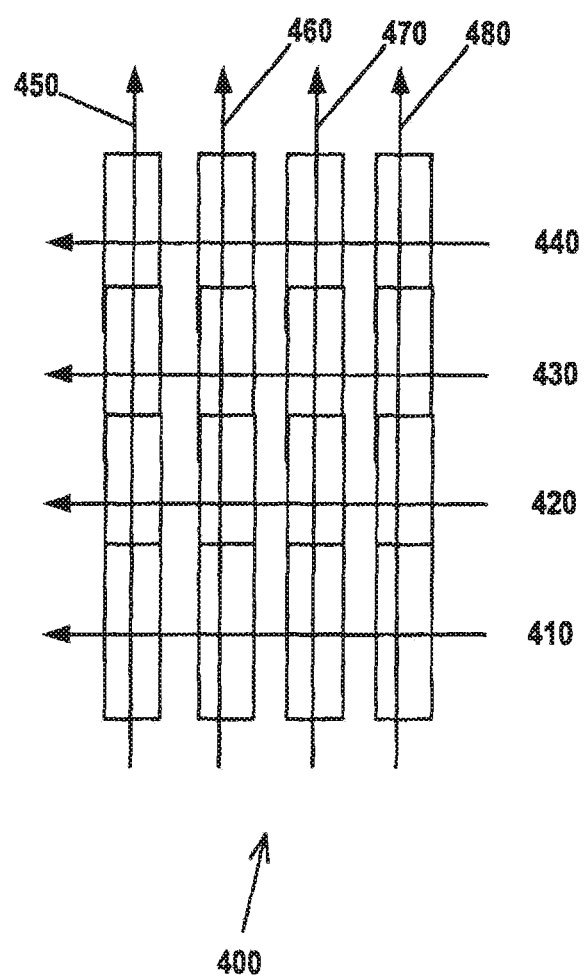
FIG. 4C is a second top view of the plurality of Applicant's rigid locking teeth shown in FIG. 4A.

FIGS. 4B and 4C comprise top views of orientation 400 shown in FIG. 4A. Referring now to FIG. 4B, the rigid locking teeth comprising column 1 are separated from the rigid locking teeth comprising column 2 by a spacing 402. In certain embodiments, spacing 402 is substantially the same as the width 382 (FIG. 3F) of the individual rigid locking teeth. By "substantially the same," Applicant means within plus or minus ten percent (10%). In other embodiments, spacing 402 is less than width 382. In still other embodiments, spacing 402 is greater than width 382.

Similarly, column 2 and 3 are separated by spacing 404, and column 3 and column 4 are separated by spacing 406. In certain embodiments, spacing 404 is substantially the same as the width 382 (FIG. 3F) of the individual rigid locking teeth. In other embodiments, spacing 404 is less than width 382. In still other embodiments, spacing 404 is greater than width 382. In certain embodiments, spacing 406 is substantially the same as the width 382 (FIG. 3F) of the individual rigid locking teeth. In other embodiments, spacing 406 is less than width 382. In still other embodiments, spacing 406 is greater than width 382.

In orientation 400 shown in FIGS. 4A, 4B, and 4C, the long axes 390 of each rigid locking tooth disposed in a column are aligned, and the short axis 395 of each rigid locking tooth disposed in a row are aligned. For example, rigid locking teeth 1,1; 1,2; 1,3; and 1,4; are each disposed in column 1. Aggregate long axis 450 comprises the individual long axis 390 of each of rigid locking teeth 1,1; 1,2; 1,3; and 1,4. Similarly, aggregate long axes 460, 470, and 480, comprise the individual long axis 390 of each rigid locking tooth disposed in columns 2, 3, and 4, respectively.

Rigid locking teeth 1,1; 2,1; 3,1; and 4,1; are disposed in row 1. Aggregate short axis 410 comprises the individual short axis 395 of each of rigid locking teeth 1,1; 2,1; 3,1; and 4,1. Similarly, aggregate short axes 420, 430, and 440, comprise the individual short axis 395 of each tooth disposed in rows 2, 3, and 4, respectively.

Figure 5A:
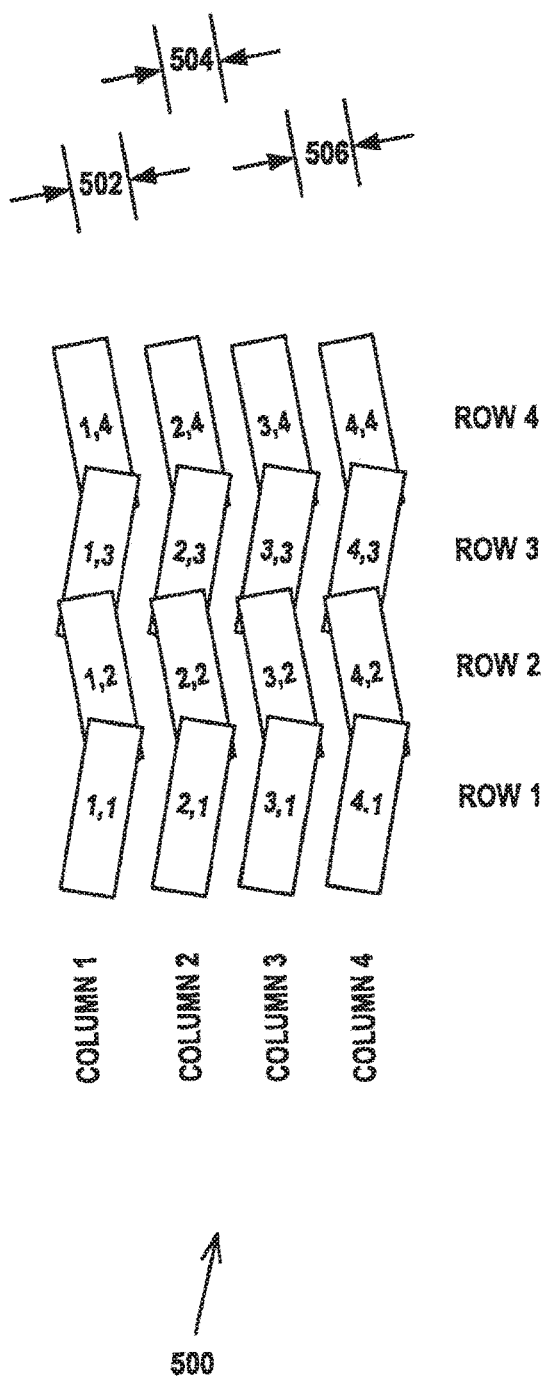
FIG. 5A is a first top view of the plurality of Applicant's rigid locking teeth arranged in a second orientation.

FIG. 5A shows a portion of Applicant's rigid locking teeth, wherein that plurality of rigid locking teeth comprise orientation 500. In certain embodiments, each of the plurality of rigid locking teeth shown in FIG. 5A comprises a rigid locking tooth 300. In certain embodiments, each of the plurality of rigid locking teeth shown in FIG. 5A comprises a rigid locking tooth 302. In certain embodiments, each of the plurality of rigid locking teeth shown in FIG. 5A comprises a rigid locking tooth 304. In certain embodiments, each of the plurality of rigid locking teeth shown in FIG. 5A comprises a rigid locking tooth 306. In certain embodiments, each of the plurality of rigid locking teeth shown in FIG. 5A is selected from the group consisting of a rigid locking tooth 300, a rigid locking tooth 302, a rigid locking tooth 304, and a rigid locking tooth 306.

In the illustrated embodiment of FIG. 5A, the plurality of rigid locking teeth are arranged in columns and rows, namely columns 1, 2, 3, and 4, and rows 1, 2, 3, and 4. In the illustrated embodiment of FIG. 5A, rigid locking tooth 1,1 for example is disposed in column 1 and row 1. For the sake of clarity, FIG. 5A shows a total of 16 rigid locking teeth.

The rigid locking teeth comprising column 1 are separated from the rigid locking teeth comprising column 2 by a spacing 502. In certain embodiments, spacing 502 is substantially the same as the width 382 (FIG. 3F) of the individual rigid locking teeth. By "substantially the same," Applicant means within plus or minus ten percent (10%). In other embodiments, spacing 502 is less than width 382. In still other embodiments, spacing 502 is greater than width 382.

Similarly, column 2 and 3 are separated by spacing 504, and column 3 and column 4 are separated by spacing 506. In certain embodiments, spacing 504 is substantially the same as the width 382 (FIG. 3F) of the individual rigid locking teeth. In other embodiments, spacing 504 is less than width 382. In still other embodiments, spacing 504 is greater than width 382. In certain embodiments, spacing 506 is substantially the same as the width 382 (FIG. 3F) of the individual rigid locking teeth. In other embodiments, spacing 506 is less than width 382. In still other embodiments, spacing 506 is greater than width 382.

Figure 5B:
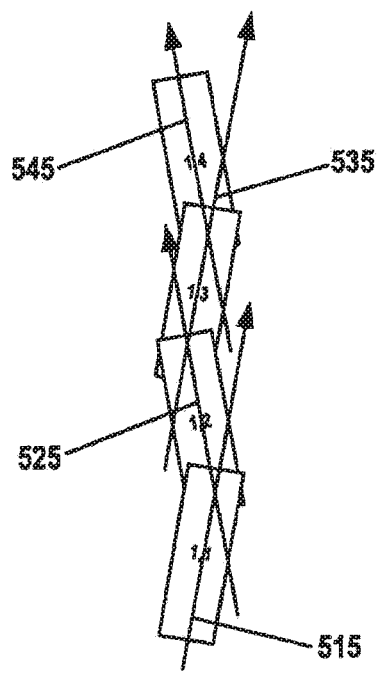
FIG. 5B is a top view of four of Applicant's rigid locking teeth arranged in the orientation of FIG. 5A.
Figure 5C:
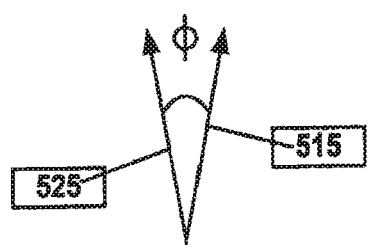
FIG. 5C shows the angle formed by the intersection of the long axes of two adjacent rigid locking teeth in the same column, wherein those rigid locking teeth are arranged in the orientation of 5A.

FIG. 5B comprise a top view of one column of rigid locking teeth disposed in orientation 500. In orientation 500, the individual long axes 390 of each rigid locking tooth disposed in a column are not aligned. For example, rigid locking tooth 1,1 comprises long axis 515, and the adjacent rigid locking tooth in column 1, namely rigid locking tooth 1,2, comprises long axis 525. As FIGS. 5B and 5C illustrate, long axes 515 and 525 are not aligned. Rather, long axis 525 is offset from long axis 515 by a first offset angle $\Phi 1$. In certain embodiments, first offset angle $\Phi 1$ is between about 5 degrees and about 45 degrees.

Similarly, long axis 535 is offset from long axis 525 by a second offset angle. In certain embodiments, second offset angle is between about 5 degrees and about 45 degrees. Long axis 545 is offset from long axis 535 by a third offset angle. In certain embodiments, the third offset angle is between about 5 degrees and about 45 degrees. As a general matter, in orientation 500 the long axis for the (i)th rigid locking tooth in (j)th column is offset from the long axis of the adjacent (i+1)th rigid locking tooth in that (j)th column by the (i)th offset angle.

Figure 5D:
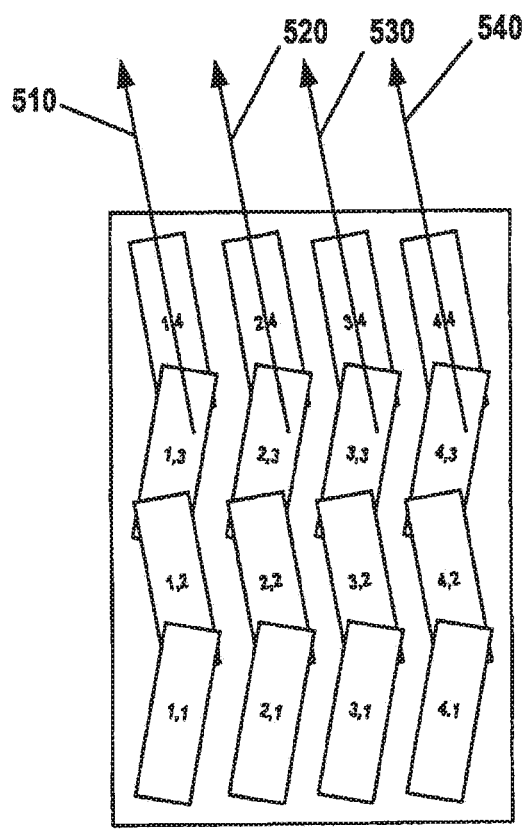
FIG. 5D is a second top view of the plurality of Applicant's rigid locking teeth shown in FIG. 5A.

In orientation 500 illustrated in FIGS. 5A and 5D, the long axes 390 of adjacent rigid locking teeth disposed in the same column are not aligned, however the long axes of the rigid locking teeth in the same row are parallel. Rigid locking teeth 1,4; 2,4; 3,4; and 4,4, are all disposed in row 4, and comprise long axes 510, 520, 530, and 540, respectively. As illustrated in FIG. 5D, long axes 510, 520, 530, and 540, are parallel.

FIG. 6A shows a portion of Applicant's plurality of rigid locking teeth, wherein that plurality of rigid locking teeth comprise orientation 600. In certain embodiments, each of the plurality of rigid locking teeth shown in FIG. 6A comprises a rigid locking tooth 300. In certain embodiments, each of the plurality of rigid locking teeth shown in FIG. 6A comprises a rigid locking tooth 302. In certain embodiments, each of the plurality of rigid locking teeth shown in FIG. 6A comprises a rigid locking tooth 304. In certain embodiments, each of the plurality of rigid locking teeth shown in FIG. 6A comprises a rigid locking tooth 306. In certain embodiments, each of the plurality of rigid locking teeth shown in FIG. 6A is selected from the group consisting of a rigid locking tooth 300, a rigid locking tooth 302, a rigid locking tooth 304, and a rigid locking tooth 306.

In the illustrated embodiment of FIG. 6A, the plurality of rigid locking teeth are arranged in columns and rows, namely columns 1, 2, 3, and 4, and rows 1, 2, 3, and 4. In the illustrated embodiment of FIG. 6A, rigid locking tooth 1,1 for example is disposed in column 1 and row 1. For the sake of clarity, FIG. 6A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a maximum spacing 602. In certain embodiments, maximum spacing 602 is substantially the same as the width 382 (FIG. 3F) of the individual rigid locking teeth. By "substantially the same," Applicant means within plus or minus twenty percent (20%). In other embodiments, maximum spacing 602 is less than width 382. In still other embodiments, maximum spacing 602 is greater than width 382.

Similarly, column 2 and 3 are separated by spacing maximum 604, and column 3 and column 4 are separated by maximum spacing 606. In certain embodiments, maximum spacing 604 is substantially the same as the width 382 (FIG. 3F) of the individual rigid locking teeth. In other embodiments, maximum spacing 604 is less than width 382. In still other embodiments, maximum spacing 604 is greater than width 382. In certain embodiments, maximum spacing 606 is substantially the same as the width 382 (FIG. 3F) of the individual rigid locking teeth. In other embodiments, maximum spacing 606 is less than width 382. In still other embodiments, maximum spacing 606 is greater than width 382.

Figure 6B:
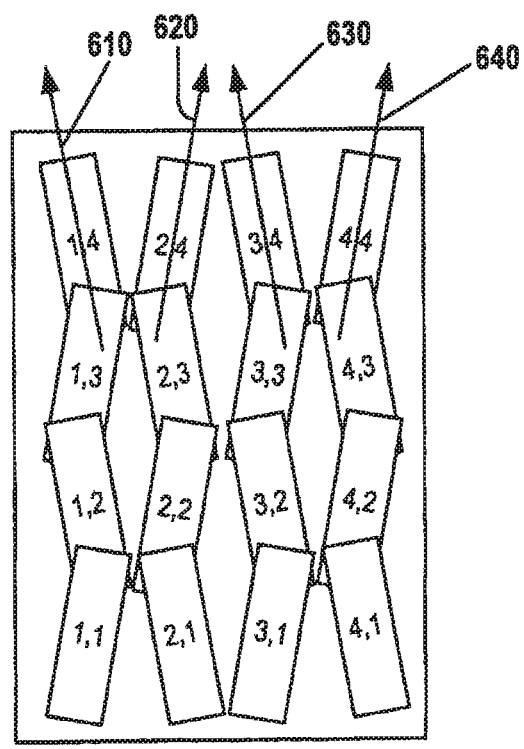
FIG. 6B is a second top view of the plurality of rigid locking teeth shown in FIG. 6A.

In orientation 600 illustrated in FIGS. 6A and 6B, the long axes 390 of adjacent rigid locking teeth disposed in the same column are not aligned. Moreover, the long axes of the rigid locking teeth in the same row are not parallel. Rigid locking teeth 1,4; 2,4; 3,4; and 4,4, are all disposed in row 4, and comprise long axes 610, 620, 630, and 640, respectively. As illustrated in FIG. 6B, long axes 610 is not parallel to long axis 620, which is not parallel to long axis 630, which is not parallel to long axis 640.

Figure 7A:
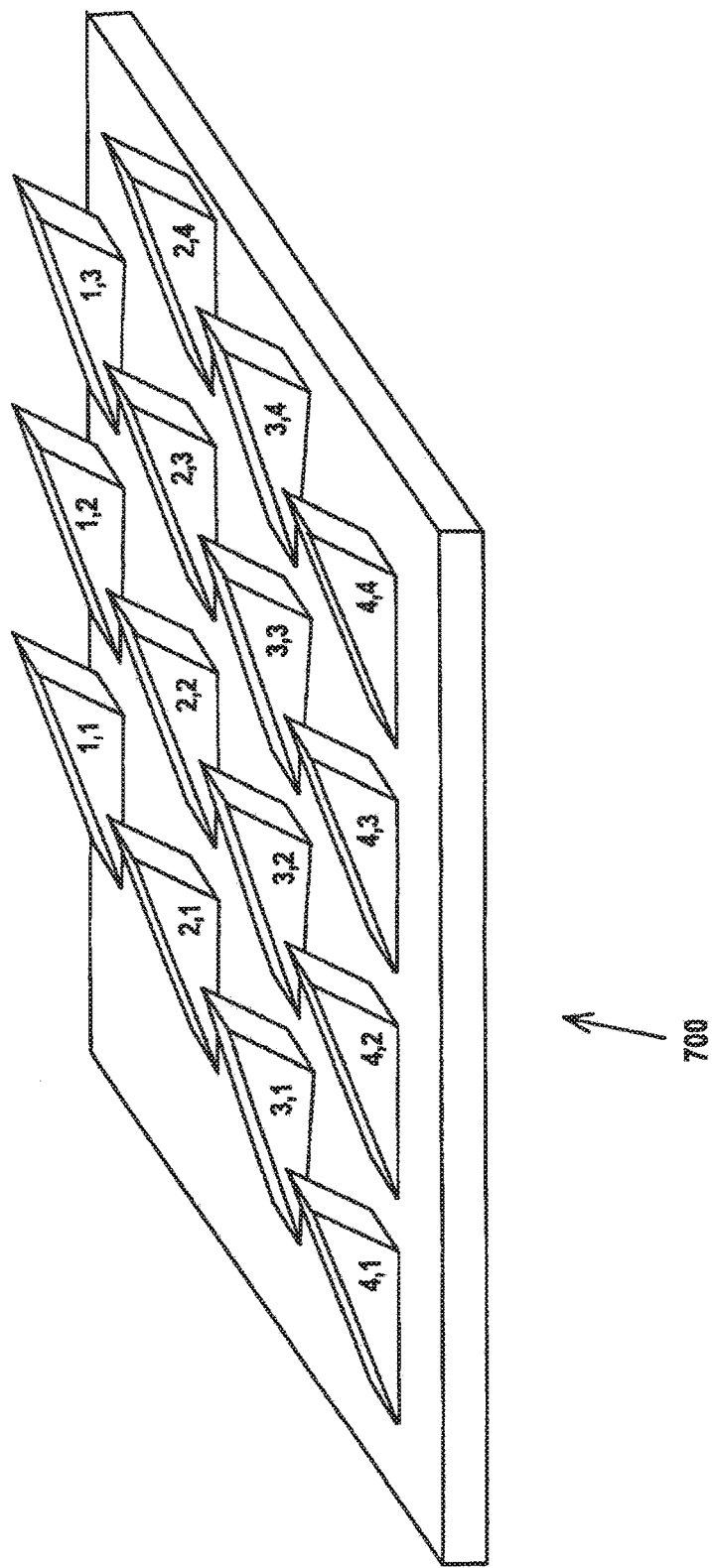
FIG. 7A is a perspective view of Applicant's rigid locking teeth arranged in a fourth orientation.

FIG. 7A shows a portion of Applicant's plurality of rigid locking teeth, wherein that plurality of rigid locking teeth comprise orientation 700. In certain embodiments, each of the plurality of rigid locking teeth shown in FIG. 7A comprises a rigid locking tooth 300. In certain embodiments, each of the plurality of rigid locking teeth shown in FIG. 7A comprises a rigid locking tooth 302. In certain embodiments, each of the plurality of rigid locking teeth shown in FIG. 7A comprises a rigid locking tooth 304. In certain embodiments, each of the plurality of rigid locking teeth shown in FIG. 7A comprises a rigid locking tooth 306. In certain embodiments, each of the plurality of rigid locking teeth shown in FIG. 7A is selected from the group consisting of a rigid locking tooth 300, a rigid locking tooth 302, a rigid locking tooth 304, and a rigid locking tooth 306.

Figure 7B:
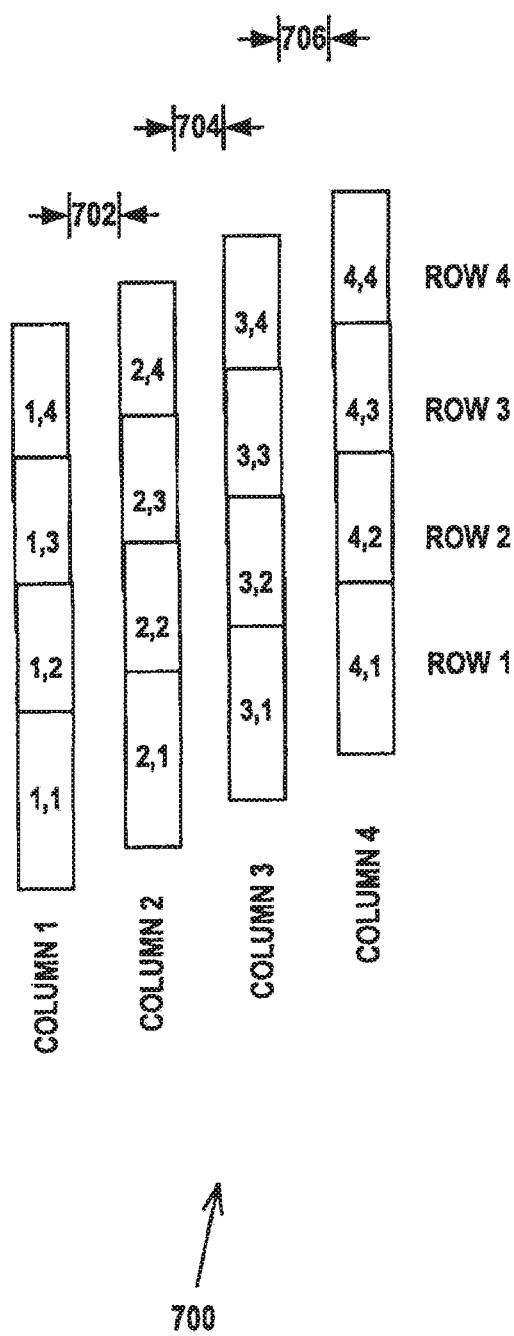
FIG. 7B is a first top view of the plurality of Applicant's rigid locking teeth arranged in the orientation of FIG. 7A.

In the illustrated embodiment of FIG. 7B, the plurality of rigid locking teeth comprising orientation 700 are arranged in columns and rows, namely columns 1, 2, 3, and 4, and rows 1, 2, 3, and 4. In the illustrated embodiment of FIG. 7B, rigid locking tooth 1,1 for example is disposed in column 1 and row 1. For the sake of clarity, FIG. 7B shows a total of 16 rigid locking teeth.

The rigid locking teeth comprising column 1 are separated from the rigid locking teeth comprising column 2 by a spacing 702. In certain embodiments, spacing 702 is substantially the same as the width 382 (FIG. 3F) of the individual rigid locking teeth. By "substantially the same," Applicant means within plus or minus ten percent (10%). In other embodiments, spacing 702 is less than width 382. In still other embodiments, spacing 702 is greater than width 382.

Similarly, column 2 and 3 are separated by spacing 704, and column 3 and column 4 are separated by spacing 706. In certain embodiments, spacing 704 is substantially the same as the width 382 (FIG. 3F) of the individual rigid locking teeth. In other embodiments, spacing 704 is less than width 382. In still other embodiments, spacing 704 is greater than width 382. In certain embodiments, spacing 706 is substantially the same as the width 382 (FIG. 3F) of the individual rigid locking teeth. In other embodiments, spacing 706 is less than width 382. In still other embodiments, spacing 706 is greater than width 382.

Figure 7C:
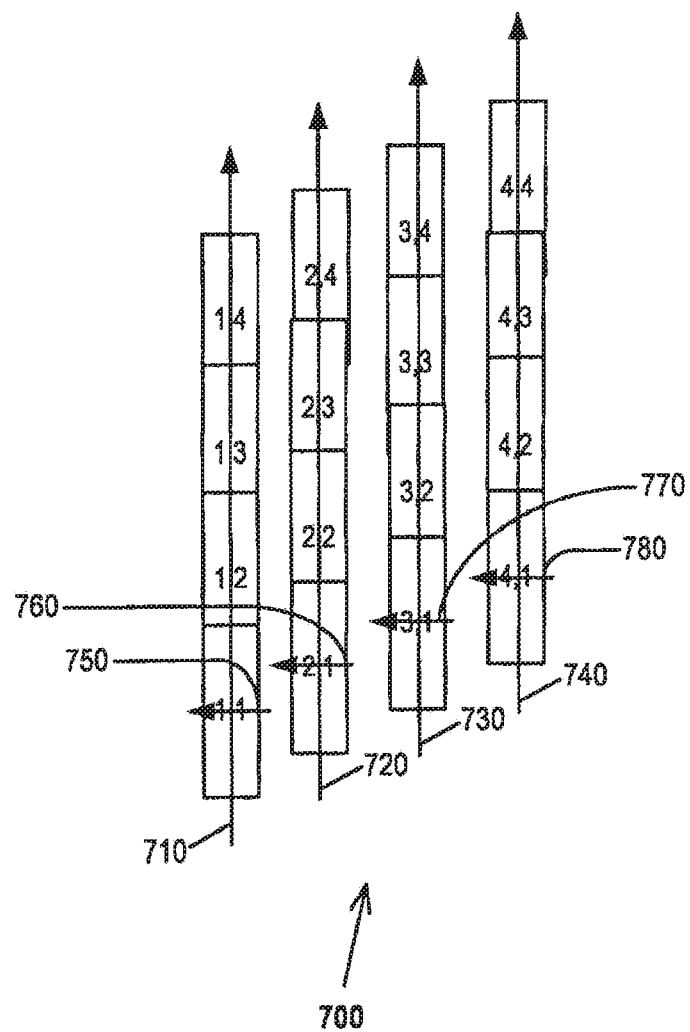
FIG. 7C is a second top view of the plurality of rigid locking teeth shown in FIG. 7A.

In orientation 700 illustrated in FIGS. 7A, 7B, and 7C, the long axes 390 of adjacent rigid locking teeth disposed in the same column are aligned. For example, aggregate long axis 710 comprises the individual long axes 390 of rigid locking teeth 1,1; 1,2; 1,3; and 1,4. Similarly, aggregate long axis 720 comprises the individual long axes 390 of rigid locking teeth 2,1; 2,2; 2,3; and 2,4. Similarly, aggregate long axis 730 comprises the individual long axes 390 of rigid locking teeth 3,1; 3,2; 3,3; and 3,4. Similarly, aggregate long axis 740 comprises the individual long axes 390 of rigid locking teeth 4,1; 2,4; 4,3; and 4,4.

In orientation 700, the short axes 395 of the rigid locking tooth disposed in the same row are not aligned. For example, rigid locking teeth 1,1; 2,1; 3,1; and 4,1, are disposed in row 1. Rigid locking tooth 1,4 comprises short axis 750. Rigid locking tooth 2,4 comprises short axis 760. Rigid locking tooth 3,4 comprises short axis 770. Rigid locking tooth 4,4 comprises short axis 780. In the illustrated embodiment of FIG. 7C, short axis 750 is not aligned with short axis 760, which is not aligned with short axis 770, which is not aligned with short axis 780.

Figure 8A:
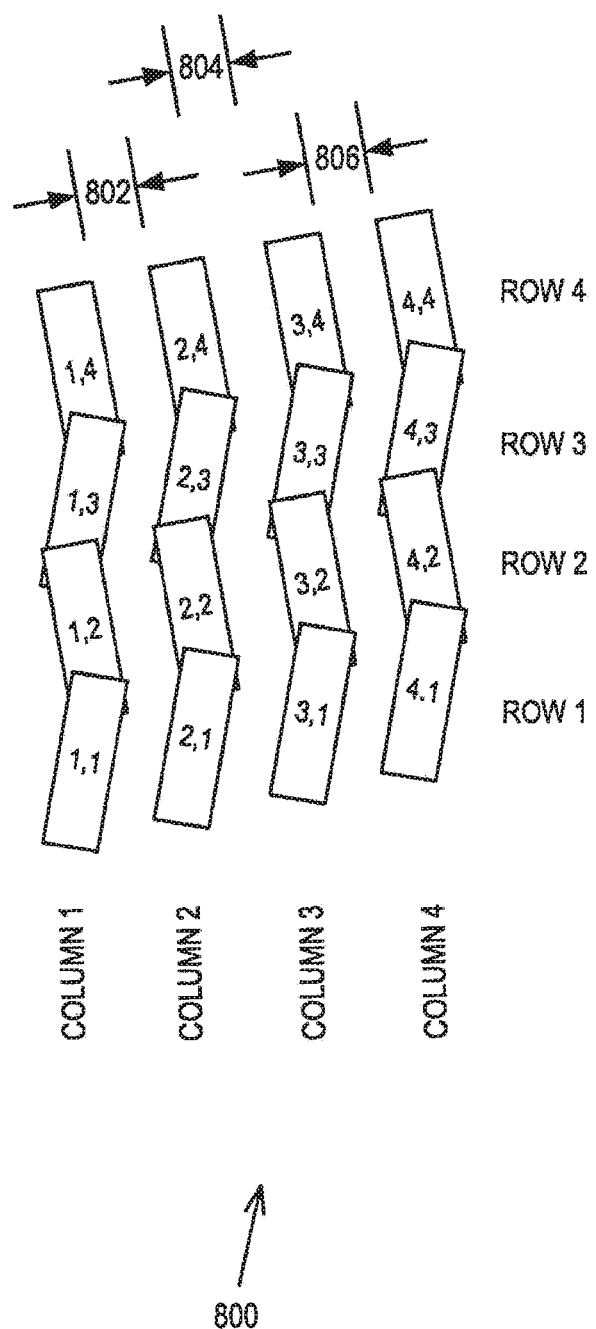
FIG. 8A is a first top view of the plurality of Applicant's rigid locking teeth arranged in a fifth orientation.

FIG. 8A shows a portion of plurality of Applicant's rigid locking teeth, wherein that plurality of rigid locking teeth comprise orientation 800. In certain embodiments, each of the plurality of rigid locking teeth shown in FIG. 8A comprises a rigid locking tooth 300. In certain embodiments, each of the plurality of rigid locking teeth shown in FIG. 8A comprises a rigid locking tooth 302. In certain embodiments, each of the plurality of rigid locking teeth shown in FIG. 8A comprises a rigid locking tooth 304. In certain embodiments, each of the plurality of rigid locking teeth shown in FIG. 8A comprises a rigid locking tooth 306. In certain embodiments, each of the plurality of rigid locking teeth shown in FIG. 8A is selected from the group consisting of a rigid locking tooth 300, a rigid locking tooth 302, a rigid locking tooth 304, and a rigid locking tooth 306.

In the illustrated embodiment of FIG. 8A, the plurality of rigid locking teeth are arranged in columns and rows, namely columns 1, 2, 3, and 4, and rows 1, 2, 3, and 4. In the illustrated embodiment of FIG. 8A, rigid locking tooth 1,1 for example is disposed in column 1 and row 1. For the sake of clarity, FIG. 8A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a spacing 802. In certain embodiments, spacing 802 is substantially the same as the width 382 (FIG. 3F) of the individual rigid locking teeth. By "substantially the same," Applicant means within plus or minus ten percent (10%). In other embodiments, spacing 802 is less than width 382. In still other embodiments, spacing 802 is greater than width 382.

Similarly, column 2 and 3 are separated by spacing 804, and column 3 and column 4 are separated by spacing 806. In certain embodiments, spacing 804 is substantially the same as the width 382 (FIG. 3F) of the individual rigid locking teeth. In other embodiments, spacing 804 is less than width 382. In still other embodiments, spacing 804 is greater than width 382. In certain embodiments, spacing 806 is substantially the same as the width 382 (FIG. 3F) of the individual rigid locking teeth. In other embodiments, spacing 806 is less than width 382. In still other embodiments, spacing 806 is greater than width 382.

Figure 8B:
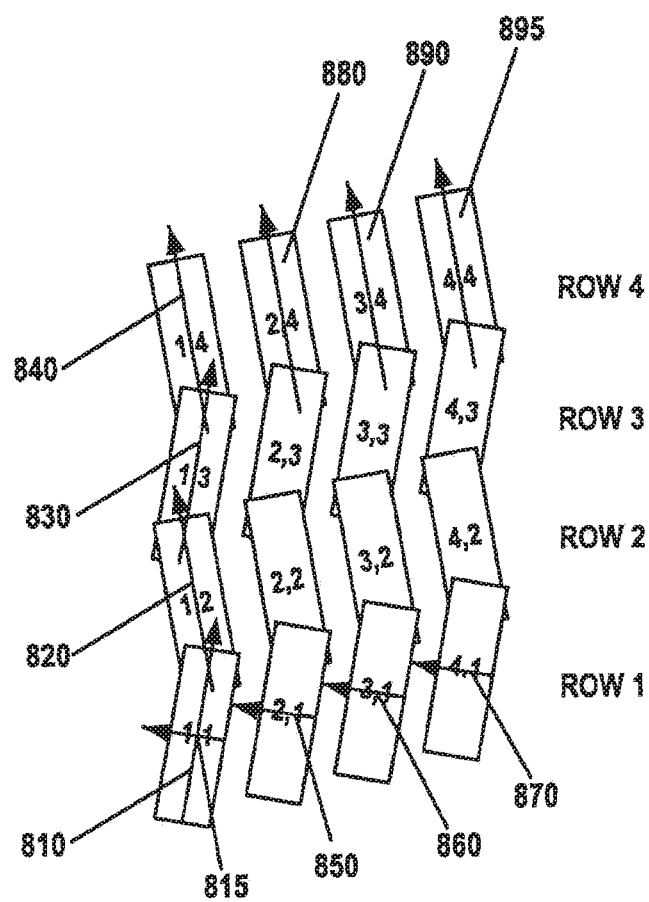
FIG. 8B is a second top view of the plurality of rigid locking teeth shown in FIG. 8A.

In orientation 800 illustrated in FIGS. 8A and 8B, the long axes 390 of adjacent rigid locking teeth disposed in the same column are not aligned. For example, rigid locking teeth 1, ; 1,2; 1,3; and 1,4; comprise long axes 810, 820, 830, and 840, respectively. Long axis 810 is not aligned with long axis 820, which is not aligned with long axis 830, which is not aligned with long axis 840.

In orientation 800, the long axes of the rigid locking teeth in the same row are parallel. Rigid locking teeth 1,4; 2,4; 3,4; and 4,4, are all disposed in row 4, and comprise long axes 840, 880, 890, and 895, respectively. As illustrated in FIG. 8B, long axes 840, 880, 890, and 895, are parallel to one another.

In orientation 800, the short axes 395 of the rigid locking tooth disposed in the same row are not aligned. For example, the rigid locking teeth 1,1; 2,1; 3,1; and 4,1; comprise short axis 815, 850, 860, and 870, respectively, wherein axis 815 is not aligned with axis 850, which is not aligned with axis 860, which is not aligned with axis 870.

Figure 9A:
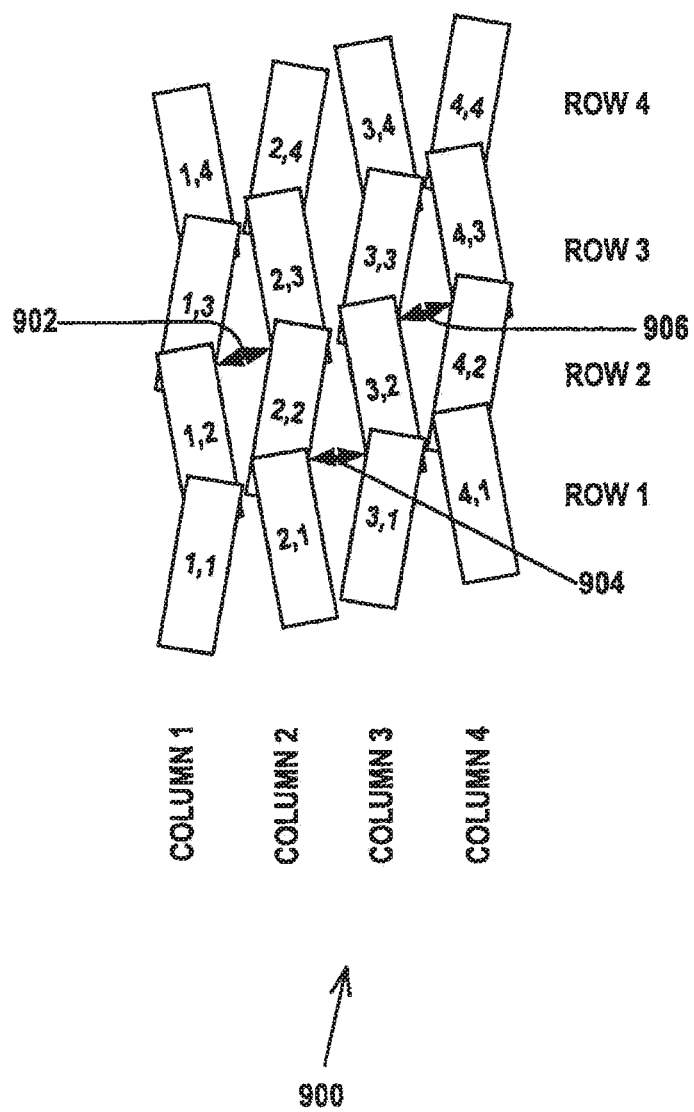
FIG. 9A is a first top view of the plurality of Applicant's rigid locking teeth arranged in a sixth orientation.

FIG. 9A shows a portion of plurality of Applicant's rigid locking teeth, wherein that plurality of rigid locking teeth comprises orientation 900. In certain embodiments, each of the plurality of rigid locking teeth shown in FIG. 9A comprises a rigid locking tooth 300. In certain embodiments, each of the plurality of rigid locking teeth shown in FIG. 9A comprises a rigid locking tooth 302. In certain embodiments, each of the plurality of rigid locking teeth shown in FIG. 9A comprises a rigid locking tooth 304. In certain embodiments, each of the plurality of rigid locking teeth shown in FIG. 9A comprises a rigid locking tooth 306. In certain embodiments, each of the plurality of rigid locking teeth shown in FIG. 9A is selected from the group consisting of a rigid locking tooth 300, a rigid locking tooth 302, a rigid locking tooth 304, and a rigid locking tooth 306.

In the illustrated embodiment of FIG. 9A, the plurality of rigid locking teeth are arranged in columns and rows, namely columns 1, 2, 3, and 4, and rows 1, 2, 3, and 4. In the illustrated embodiment of FIG. 9A, rigid locking tooth 1,1 for example is disposed in column 1 and row 1. For the sake of clarity, FIG. 9A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a maximum spacing 902. In certain embodiments, maximum spacing 902 is substantially the same as the width 382 (FIG. 3F) of the individual rigid locking teeth. By "substantially the same," Applicant means within plus or minus ten percent (10%). In other embodiments, maximum spacing 902 is less than width 382. In still other embodiments, maximum spacing 902 is greater than width 382.

Similarly, column 2 and 3 are separated by spacing maximum 904, and column 3 and column 4 are separated by maximum spacing 906. In certain embodiments, maximum spacing 904 is substantially the same as the width 382 (FIG. 3F) of the individual rigid locking teeth. In other embodiments, maximum spacing 904 is less than width 382. In still other embodiments, maximum spacing 904 is greater than width 382. In certain embodiments, maximum spacing 906 is substantially the same as the width 382 (FIG. 3F) of the individual rigid locking teeth. In other embodiments, maximum spacing 906 is less than width 382. In still other embodiments, maximum spacing 906 is greater than width 382.

Figure 9B:
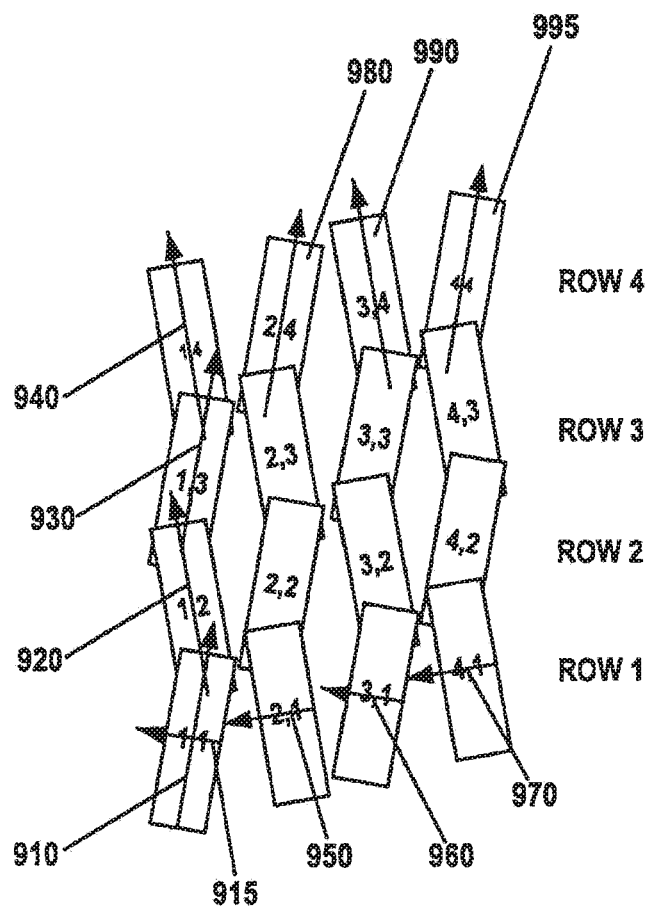
FIG. 9B is a second top view of the plurality of rigid locking teeth shown in FIG. 9A.

In orientation 900 illustrated in FIGS. 9A and 9B, the long axes 390 of adjacent rigid locking teeth disposed in the same column are not aligned. For example, rigid locking teeth 1,1; 1,2; 1,3; and 1,4; comprise long axes 910, 920, 930, and 940, respectively. Long axis 910 is not aligned with long axis 920, which is not aligned with long axis 930, which is not aligned with long axis 940.

In orientation 900, the long axes of the rigid locking teeth in the same row are not parallel. Rigid locking teeth 1,4; 2,4; 3,4; and 4,4, are all disposed in row 4, and comprise long axes 940, 980, 990, and 995, respectively. As illustrated in FIG. 8B, long axis 940 is not parallel with long axis 980, which is not parallel with long axis 990, which is not parallel with long axis 995. Alternate long axes, such as long axes 940 and 990 and long axes 980 and 995, are parallel to one another.

In orientation 900, the short axes 395 of the rigid locking teeth disposed in the same row are not aligned. For example, the rigid locking teeth 1,1; 2,1; 3,1; and 4,1; comprise short axis 915, 950, 960, and 970, respectively, wherein axis 915 is not aligned with axis 950, which is not aligned with axis 960, which is not aligned with axis 970.

While the preferred embodiments of the present invention have been illustrated in detail, it should be apparent that modifications and adaptations to those embodiments may occur to one skilled in the art without departing from the scope of the present invention as set forth herein.

I claim:

1. A fixturing apparatus, comprising:
    a tubular member formed to include an aperture extending therethrough, said aperture having a first end and a second end;
    a plurality of locking teeth disposed on a surface defining said aperture and extending into said aperture;
    wherein:
    each locking tooth of said plurality of locking teeth comprises a rectangular base, a first rectangular side attached to a first short end of said rectangular base and extending outwardly therefrom, and a second rectangular side attached to an opposing short end of said rectangular base and extending outwardly therefrom, wherein a first rectangular side distal end is attached to a said second rectangular side distal end to form a gripping edge;
    an end of a flexible strap can be inserted into said first end of said aperture, and moved in a first direction through said aperture and outwardly therefrom through said second end of said aperture; and
    after insertion in and through said aperture in said first direction, said flexible strap cannot be moved backwardly through said aperture in a second and opposite direction.

2. The fixturing apparatus of claim 1, further comprising an annular lip attached to said tubular member and extending outwardly therefrom.

3. The fixturing apparatus of claim 1, wherein said plurality of locking teeth each comprises a five-sided structure.

4. The fixturing apparatus of claim 1, wherein said plurality of locking teeth each comprises a six-sided structure.

5. The fixturing apparatus of claim 1, wherein:
    said rectangular base comprises two parallel opposing short sides in combination with two parallel and opposing long sides;
    each locking tooth comprises a long axis parallel to said long sides and which bisects each short side;
    each locking tooth comprises a short axis parallel to said short sides and which bisects each long side;
    said plurality of locking teeth are arranged in a plurality of columns and a plurality of rows.

6. The fixturing apparatus of claim 5, wherein the long axis of each locking teeth disposed in a column is aligned with one another.

7. The fixturing apparatus of claim 5, wherein the short axis of each locking tooth disposed in a row is aligned with one another.

8. The fixturing apparatus of claim 5, wherein the short axis of each locking tooth disposed in a row is not aligned with one another.

* * * * *